United States Patent
Briand et al.

(10) Patent No.: US 9,987,709 B2
(45) Date of Patent: Jun. 5, 2018

(54) METHOD FOR CUTTING STAINLESS STEEL WITH A FIBER LASER

(71) Applicants:L'Air Liquide, Société Anonyme pour l'Etude et l'Exploitation des Procédés Georges Claude, Paris (FR); Air Liquide Welding France, Paris (FR)

(72) Inventors: Francis Briand, Paris (FR); Karim Chouf, Montmorency (FR); Hakim Maazaoui, Pierrelaye (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days. days.

(21) Appl. No.: 14/611,444

(22) Filed: Feb. 2, 2015

(65) Prior Publication Data

US 2015/0174701 A1    Jun. 25, 2015

Related U.S. Application Data

(63) Continuation of application No. 13/152,171, filed on Jun. 2, 2011, now abandoned, which is a continuation
(Continued)

(30) Foreign Application Priority Data

Nov. 25, 2005    (FR) ..................... 05 53607

(51) Int. Cl.
*B23K 26/40*    (2014.01)
*B23K 26/12*    (2014.01)
(Continued)

(52) U.S. Cl.
CPC ............ *B23K 26/40* (2013.01); *B23K 26/123* (2013.01); *B23K 26/125* (2013.01);
(Continued)

(58) Field of Classification Search
CPC  B23K 26/123; B23K 26/125; B23K 26/1405; B23K 16/142; B23K 26/38; B23K 26/40; B23K 26/4005
See application file for complete search history.

(56) References Cited

U.S. PATENT DOCUMENTS

| 4,672,209 A | 6/1987 | Karasaki et al. |
| 4,759,604 A | 7/1988 | Utsumi et al. |

(Continued)

FOREIGN PATENT DOCUMENTS

| DE | 198 59 243 | 7/2000 |
| EP | 0 770 448 | 5/1997 |

(Continued)

OTHER PUBLICATIONS

Kleine et al., "Pulse Shaping for Miro Cutting Applications of Metals with Fiber Lasers", Jul. 2004, Proceedings of SPIE, vol. 5339, pp. 510-517.*

(Continued)

*Primary Examiner* — Geoffrey S Evans
(74) *Attorney, Agent, or Firm* — Elwood L. Haynes

(57) ABSTRACT

The invention relates to a laser cutting method for cutting a stainless steel workpiece using laser beam generation means comprising a silica fiber with an ytterbium-doped core to generate the laser beam. Preferably, the laser beam generated by the ytterbium-based fiber has a wavelength between 1.07 and 1.09 μm, a quality factor of the laser beam is between 0.33 and 8 mm·mrad, and the laser beam has a power of between 0.1 and 25 kW. The assistance gas for the laser beam is chosen from nitrogen, helium, argon and mixtures thereof, and, optionally, it further contains one or more additional compounds chosen from $O_2$, $CO_2$, $H_2$ and $CH_4$.

10 Claims, 2 Drawing Sheets

Related U.S. Application Data of application No. 11/560,299, filed on Nov. 15, 2006, now abandoned.

(51) Int. Cl.
  B23K 26/38 (2014.01)
  B23K 26/142 (2014.01)
  B23K 103/00 (2006.01)
  B23K 103/04 (2006.01)

(52) U.S. Cl.
  CPC ............ *B23K 26/142* (2015.10); *B23K 26/38* (2013.01); *B23K 2203/05* (2015.10); *B23K 2203/50* (2015.10)

(56) References Cited

U.S. PATENT DOCUMENTS

| | | | |
|---|---|---|---|
| 4,908,493 A * | 3/1990 | Susemihl | B23K 26/06 219/121.67 |
| 5,073,694 A | 12/1991 | Tessier et al. | |
| 5,180,450 A | 1/1993 | Rao | |
| 5,196,672 A * | 3/1993 | Matsuyama | B23K 26/064 219/121.62 |
| 5,380,976 A | 1/1995 | Couch et al. | |
| 5,780,806 A * | 7/1998 | Ferguson | B08B 7/0042 219/121.68 |
| 6,040,549 A | 3/2000 | Kanaoka | |
| 6,085,786 A | 7/2000 | Forsythe | |
| 6,208,458 B1 | 3/2001 | Galvanauskas et al. | |
| 6,313,432 B1 | 11/2001 | Nagata et al. | |
| 7,004,637 B1 | 2/2006 | Uyama et al. | |
| 7,348,517 B2 | 3/2008 | Egawa et al. | |
| 7,508,575 B2 | 3/2009 | Papernyi et al. | |
| 2001/0019043 A1 | 9/2001 | Bertez et al. | |
| 2002/0074318 A1* | 6/2002 | Vogt | B23K 26/0853 219/121.67 |
| 2002/0088784 A1 | 7/2002 | Bertez | |
| 2002/0162604 A1 | 11/2002 | Matile et al. | |
| 2003/0055413 A1 | 3/2003 | Altshuler et al. | |
| 2003/0192865 A1 | 10/2003 | Cole, III et al. | |
| 2003/0209049 A1 | 11/2003 | Jones et al. | |
| 2004/0089643 A1 | 5/2004 | Jones et al. | |
| 2004/0245226 A1 | 12/2004 | Callies et al. | |
| 2005/0024743 A1 | 2/2005 | Camy-Peyret | |
| 2005/0067384 A1* | 3/2005 | Talwar | B23K 26/0604 219/121.6 |
| 2005/0067393 A1 | 3/2005 | Olivier | |
| 2005/0094684 A1 | 5/2005 | Hermann et al. | |
| 2005/0109745 A1 | 5/2005 | Wessner | |
| 2005/0169326 A1 | 8/2005 | Jacob et al. | |
| 2006/0044981 A1 | 3/2006 | Egawa et al. | |
| 2006/0209394 A1 | 9/2006 | Papernyi et al. | |
| 2007/0119833 A1 | 5/2007 | Briand et al. | |
| 2007/0119834 A1 | 5/2007 | Briand et al. | |
| 2007/0151961 A1 | 7/2007 | Kleine et al. | |
| 2008/0000888 A1* | 1/2008 | Schulz | B23K 26/38 219/121.72 |
| 2012/0012570 A1 | 1/2012 | Briand et al. | |
| 2014/0000678 A1 | 1/2014 | Shimohira et al. | |

FOREIGN PATENT DOCUMENTS

| | | |
|---|---|---|
| EP | 1 479 473 | 11/2004 |
| JP | 2003 053577 | 2/2003 |
| JP | 2004 291031 | 10/2004 |
| WO | WO 96 23624 | 8/1996 |
| WO | WO 03 018246 | 3/2003 |
| WO | WO 2005 053895 | 6/2005 |
| WO | WO 2005 074573 | 8/2005 |
| WO | WO 2006 034562 | 4/2006 |

OTHER PUBLICATIONS

Batarseh et al.., "Deep hole penetration of rock for oil production using Ytterbium fiber laser", Sep. 2004, Proceedings of SPIE, vol. 5448, pp. 818-826.*

Penn et al., "Trends in Laser Material Processing for Cutting, Welding and Metal Deposition using Carbon Dioxide, Direct Diode, and Fiber Lasers", Mar. 2005 ,Proceedings of SPIE, vol. 5706, pp. 25-37.*

Carroll, D.L. et al., "Experimental study of cutting thick aluminum and steel with a chemical oxygen-iodine laser using an $N_2$ or $O_2$ gas assist," Proceedings of the XI International Symposium on Gas Flow and Chemical Lasers and High Power Laser Conference, Edinburgh, UK, Aug. 25-30, 1996, SPIE vol. 3092, ed. H.J. Baker, 758-763 (1997).

Grupp, M. et al., "Fibre lasers—A new high power beam source for materials processing," Bremen, Sep. 2003, http://www.ipgphotonics.com/resource_technical.htm.

Kleine, K.F. et al., "Use of Fiber Lasers for Micro Cutting Applications in the Medical Device Industry," Proceedings of the 21$^{st}$ International Congress on Applications of Lasers and Electro-Optics, Scottsdale, Arizona, Oct. 14-17, 2002 (ICALEO 2002), http://www.lasers.org.uk/paperstore/Cutting2.pdf.

Penn et al., "Trends in laser material processing for cutting, welding, and metal depositions using carbon dioxide, direct diode, and fiber lasers," Mar. 2005, Proceedings of SPIE, vol. 5706, 25-37.

Shiner, B., "Fiber lasers for material processing," LIA Today Archives, Apr. 2004, http://www.laserinstitute.org/publications/lia_today/archive/articles/fiberlaser/index.php3.

Press Release: "IPG Demonstrates High Brightness 5kW Fiber Laser," http://www.ipgphotonics.com/pr_562004/news_detail.htm, May 6, 2004.

E-mail from Terence Solomon, Jul. 29, 2009.

French Search Report for related FR 0553605, dated Jul. 11, 2006.

French Search Report for corresponding FR 0553607, dated Jul. 11, 2006.

* cited by examiner

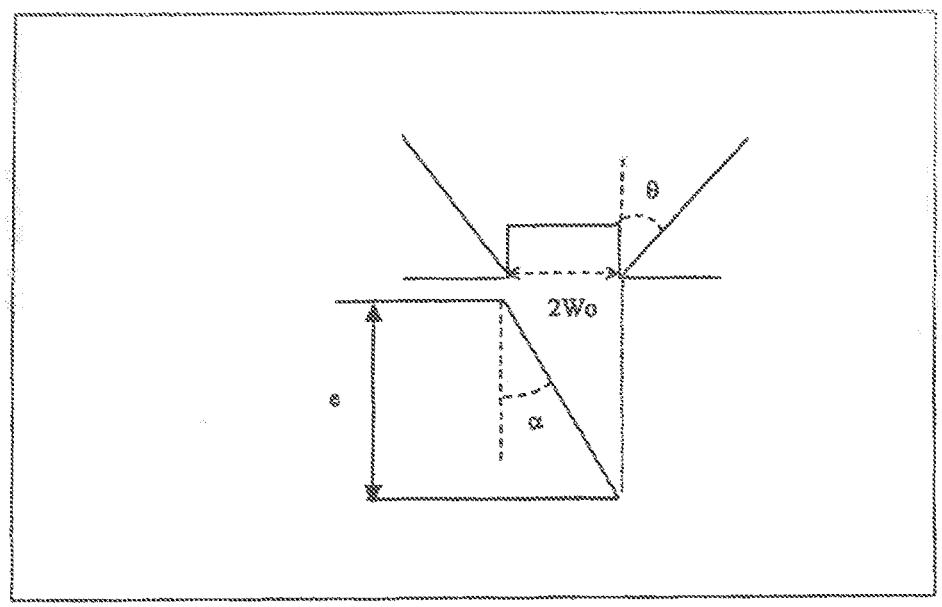
FIGURE 3
FIGURE 4
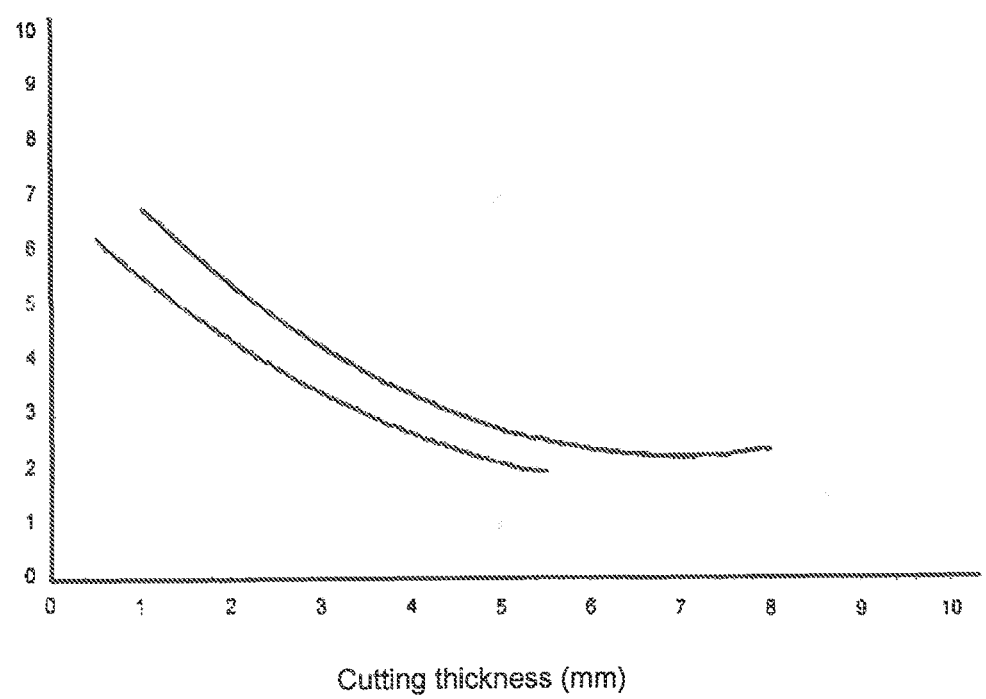
Cutting thickness (mm)

METHOD FOR CUTTING STAINLESS STEEL WITH A FIBER LASER

CROSS REFERENCE TO RELATED APPLICATIONS

This application is a continuation of U.S. patent application Ser. No. 13/152,171, now abandoned, filed Jun. 2, 2011, which is a continuation of U.S. patent application Ser. No. 11/560,299, now abandoned, filed Nov. 15, 2006 which claims the benefit of priority under 35 U.S.C. § 119(a) and (b) to French Application No. 0553607, filed Nov. 25, 2005, the entire contents of which are incorporated herein by reference.

BACKGROUND

The invention relates to a laser cutting method for cutting stainless steel using a laser source of the ytterbium-doped fiber type.

At the present time, laser cutting using a laser source of the $CO_2$ type to generate a laser beam, with a wavelength of 10.6 µm and a power ranging up to 6 kW, is widely used in industry. This method is used in particular for cutting stainless steels.

However, the cutting speeds that can be achieved and the cutting quality that results therefrom are very variable, depending on the material to be cut and, moreover, depending on the cutting method parameters adopted, such as the nature of the assistance gas, the diameter of the focused beam, the power of the incident laser, etc.

Thus, $CO_2$ lasers cannot be used with assistance gases of low-ionization potential, for example such as argon, without the risk of generating parasitic plasmas that could impair the method.

Furthermore, $CO_2$ lasers are limited in terms of power, thereby directly impacting the cutting speed.

In addition, the fact of having to guide the laser beam from the laser generator right to the focusing head, that is to say the cutting head, has drawbacks, especially as regards alignment of the optics in the optical path. This is because guiding optics are generally polished and/or coated copper mirrors and the positions of the latter determine the path followed by the laser beam. Therefore, the alignment of the mirrors must be perfect in order to ensure optimum entry of the laser beam into the focusing head or cutting head. Now, the position of these mirrors is generally adjusted by mechanical means, which may easily go out of alignment according to time, the wear of parts and the environmental conditions, in particular the ambient temperature, moisture content, etc.

In addition, the optical path of the beam must necessarily be kept in an inert atmosphere in order to avoid any contamination and to maintain a medium with a constant optical index, which is necessary for good propagation of the beam. These conditions make it possible for the properties relating to the beam diameter and the transverse distribution of the beam energy, and for the beam quality properties, to remain satisfactory for the method, the quality factor for beam parameter product (BPP) of the high-power $CO_2$ laser beams used in cutting generally being between 3 mm·mrad and 6 mm·mrad. Such an atmosphere also makes it possible to preserve the guiding optics and to prevent them from deteriorating.

Now, this is not practical in an industrial situation and incurs additional costs.

In an attempt to alleviate these problems, it has been proposed to cut stainless steel with a laser device of the Nd:YAG type within which the beam is generated by a resonator containing a solid amplifying medium, that is to say a neodymium (Nd)-doped YAG rod, and sent via an optical fiber to the focusing head.

However, this solution is not entirely satisfactory from the industrial standpoint either.

This is because it has been found that cutting with a laser beam obtained with an Nd:YAG laser source with a wavelength of 1.06 µm gives poor results in terms of cutting quality and cutting speed.

This is because Nd:YAG-type lasers have quality factors unsuitable for the laser cutting process. The quality factors (BPP values) of these lasers are typically in the range from around 15 mm·mrad to 30 mm·mrad, depending on the source. Now, the higher the quality factor of a laser, i.e. the higher the product of the focused beam waist multiplied by the beam divergence, the less effective the laser beam for the laser cutting process.

In addition, the transverse energy distribution in a focused Nd:YAG laser beam is not Gaussian but has a top-hat profile, while beyond the focal point the transverse energy distribution is random.

More generally, to cut stainless steel by laser cutting with an Nd:YAG laser is far from being obvious when it is desired to achieve cutting speeds and cutting qualities that are acceptable from the industrial standpoint.

The problem that arises is therefore how to provide an improved and industrially acceptable method for cutting stainless steels with a laser beam, which can achieve, depending on the thickness in question, speeds ranging up to 15 to 20 m/min, or even higher, and good cutting quality, that is to say straight cutting faces, no burrs and reduced roughness.

SUMMARY

The solution provided by the invention is therefore a laser cutting method for cutting a stainless steel workpiece, in which laser beam generation means comprising at least one ytterbium-containing fiber for generating a laser beam are used to melt the workpiece and thereby perform the actual cutting, characterized in that the quality factor of the laser beam is between 0.33 and 8 mm·mrad.

The laser beam generation means comprise an exciter, preferably several exciters, which cooperate with at least one excited element, also called amplifying medium, in order to generate the laser beam. The exciters are preferably several laser diodes, while the excited elements are fibers, preferably silica fibers with an ytterbium-doped core.

For the purpose of the invention, the terms "laser beam generation means" and "resonator" will be used indiscriminately.

Depending on the case, the method of the invention may include one or more of the following features:
the fiber(s) is (are) formed from an ytterbium-doped core clad with silica;
the laser beam generated by the ytterbium-based fiber has a wavelength between 1 and 5 µm, preferably between 1.04 and 3 µm;
the laser beam generated by the ytterbium-based fiber has a wavelength between 1.07 and 1.09 µm, preferably of 1.07 µm;

the laser beam has a power of between 0.1 and 25 kW, preferably between 0.5 and 15 kW;

the laser beam is a continuous or pulsed laser beam, preferably a continuous laser beam;

the workpiece to be cut has a thickness between 0.25 and 30 mm, preferably between 0.40 and 20 mm;

the cutting speed is between 0.1 and 25 m/min, preferably from 2 to 20 m/min;

the assistance gas for the laser beam is chosen from nitrogen, helium, argon and mixtures thereof, and, optionally, it further contains one or more additional compounds chosen from $O_2$, $CO_2$, $H_2$, $CH_4$, etc.;

the quality factor of the laser beam is between 1 and 8 mm·mrad, preferably greater than 2 mm·mrad, even more preferably greater than 3 mm·mrad and/or preferably less than 7 mm·mrad and even more preferably less than 5 mm·mrad;

more generally, the assistance gas pressure is between about 8 bar and 25 bar, and is chosen according to the thickness that is to be cut; and the diameter of the gas injection orifice is between 0.5 and 4 mm, typically between 1 and 3 mm, the diameter increasing with the thickness of the workpiece to be cut.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 3 illustrates the configuration during cutting at the kerf (material of thickness e), where the angle of divergence θ of the laser beam after focusing, the diameter 2Wo of the focused beam and the angle α of the cutting front have been indicate; and FIG. 4 illustrates the variation in the optimum angle α of the cutting front as a function of the cutting thickness.

DESCRIPTION OF PREFERRED EMBODIMENTS

Figure 1:
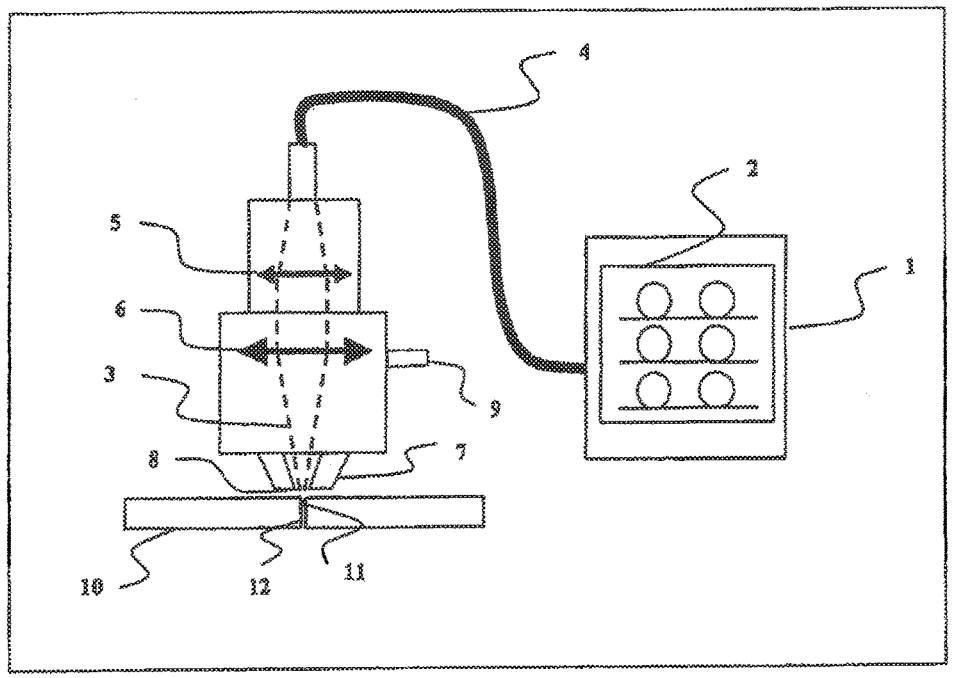
FIG. 1 illustrates a diagram showing the principle of an installation for implementing a laser cutting method using a laser beam 3 to cut a stainless steel workpiece 10.

FIG. 1 appended hereto is a diagram showing the principle of an installation for implementing a laser cutting method using a laser beam 3 to cut a stainless steel workpiece 10, employing a laser source 1 with a resonator or laser beam generation means 2 formed by silica fiber with an ytterbium-doped core to generate the laser beam 3.

The laser source 1 is used to generate a laser beam 3 with a wavelength between 1 μm and 5 μm, more precisely, at 1.07 μm.

The beam 3 propagates as far as the zone 11 of interaction between the beam 3 and the workpiece 10, that is to say the zone where the kerf appears, through beam-conveying means 4, such as an optical fiber made of fused silica with a diameter of between 20 μm and 300 μm.

On exiting from this fiber 4, the laser beam 3 possesses particular optical characteristics and a quality factor (BPP) of between 1 and 8 mm·mrad.

The beam 3 is then collimated using an optical collimator 5 equipped with a collimation doublet made of fused silica coated so as to limit the divergence of the beam exiting the fiber and to make the laser beam parallel.

The parallel beam 3, the divergence of which has been considerably limited by the collimator, is then focused onto or into the workpiece 10 to be cut by a coated, fused-silica lens 6 having a focal length of between 80 mm and 510 mm, preferably between 100 mm and 250 mm.

Before striking the workpiece 10, the beam 3 passes axially through the laser head, which is equipped with a nozzle 7 having an axial exit orifice 8 located facing the workpiece 10 to be cut, the beam 3 and the assistance gas passing through said nozzle. The orifice of the nozzle may be between 0.5 mm and 5 mm, preferably between 1 mm and 3 mm.

The laser head itself is fed with assistance gas via a gas inlet 9, for example for an inert gas such as nitrogen, argon, helium or a mixture of several of these gases, or else an active gas, for example, such as oxygen, or even active/inert gas mixtures.

The assistance gas is used to remove the molten metal from the kerf 12 being formed in the workpiece 10, as the workpiece undergoes relative displacement with respect to the laser head along the desired cutting path. The reverse situation, consisting in moving the cutting head while keeping the workpiece stationary gives the same result.

FIG. 3 is a diagram illustrating the configuration during cutting at the kerf (material of thickness e), where the angle of divergence θ of the laser beam after focusing, the diameter 2Wo of the focused beam and the angle α of the cutting front have been indicated.

The beam quality factor or BPP is defined as the product of the divergence angle θ multiplied by its radius Wo.

The cutting process is governed by the absorption of energy from the laser beam in the material during cutting. Depending on the wavelength of the laser beam employed, there therefore exists an optimum angle for energy absorption by the material. Outside this optimum angle, some of the energy is reflected and/or lost.

FIG. 3 illustrates the fact that, in the optimum cutting condition, the angle α of the cutting front corresponds to exposure of the entire thickness e of the material to the beam with a diameter 2Wo.

FIG. 4 shows the variation in the optimum angle α of the cutting front as a function of the cutting thickness. The upper curve corresponds to that obtained with a 4 kW $CO_2$ laser in TEM 01* mode, while the lower curve is that obtained with a 2 kW ytterbium-based fiber laser according to the invention. The two curves are not coincident because of the difference in optimum energy absorption angle at 10.6 μm, which is the wavelength of the $CO_2$ laser, and at 1.07 μm, which is the wavelength of the ytterbium-based fiber laser.

It is clearly apparent from these curves that, for small thicknesses, the optimum angle of the cutting front is higher than for larger thicknesses. The maximum angle for transmitting the laser energy into the material is obtained geometrically, and is the sum of the angles, namely α+θ.

It will therefore be understood that, when small thicknesses (a few mm) are being cut, it is necessary to use a low beam divergence angle, that is to say a small BPP, since the spot diameter is set by the fiber diameter used, in order to keep the optimum energy absorption angle constant.

It is also deduced therefrom that the transmission of the energy from the beam to the material becomes less efficient beyond a value of 8 mm·mrad.

Therefore, for the purpose of the invention, a laser beam having a quality factor preferably between 1 and 8 mm·mrad, more preferably between 2 and 8 mm·mrad, is used.

EXAMPLE

To demonstrate the effectiveness of the method of the invention, several cutting trials on stainless steel workpieces were carried out using a resonator which contained an amplifying medium or means of generating the laser beam, composed of optical fibers with an ytterbium-doped core according to the method of the invention and results obtained are given in the example below.

More precisely, the laser source used in the example below consisted of an amplifying medium formed from diode-excited ytterbium-doped fibers, generating a laser beam of 2 kW power and 1.07 µm wavelength, propagated in a 100 µm coated fused-silica optical fiber, possessing a quality factor (BPP) on exiting the fiber of 4 mm·mrad. The collimator located at the exit of the fiber was equipped with a doublet of 55 mm focal length.

To determine the speed ranges that could be achieved with the method of the invention according to the thicknesses of the workpieces to be cut and the pressure and composition of the assistance gas employed, cutting trials were carried out on stainless steel workpieces having thicknesses of between 1.5 mm and 8 mm.

The gas used was an inert gas, namely nitrogen, and was injected into the interaction zone where the beam interacts with the workpiece at pressures varying between 8 and 25 bar depending on the gas used, through laser cutting nozzles having orifices with diameters ranging between 0.5 and 4 mm depending on the case, typically between 1 and 3 mm in diameter. The greater the thickness to be cut, the larger the diameter of the nozzle has to be.

Focusing lenses with a focal length of between 127 mm and 190.5 mm were used to focus the laser beam generated by the amplifying medium containing diode-excited ytterbium-doped fibers and conveyed to the focusing lens of the cutting head by optical conveying means, such as a 100 µm-diameter optical fiber.

More precisely, thicknesses of 4 mm or less are usually cut with 127-mm focal length lenses and greater thicknesses with 190.5-mm focal length lenses.

Figure 2:
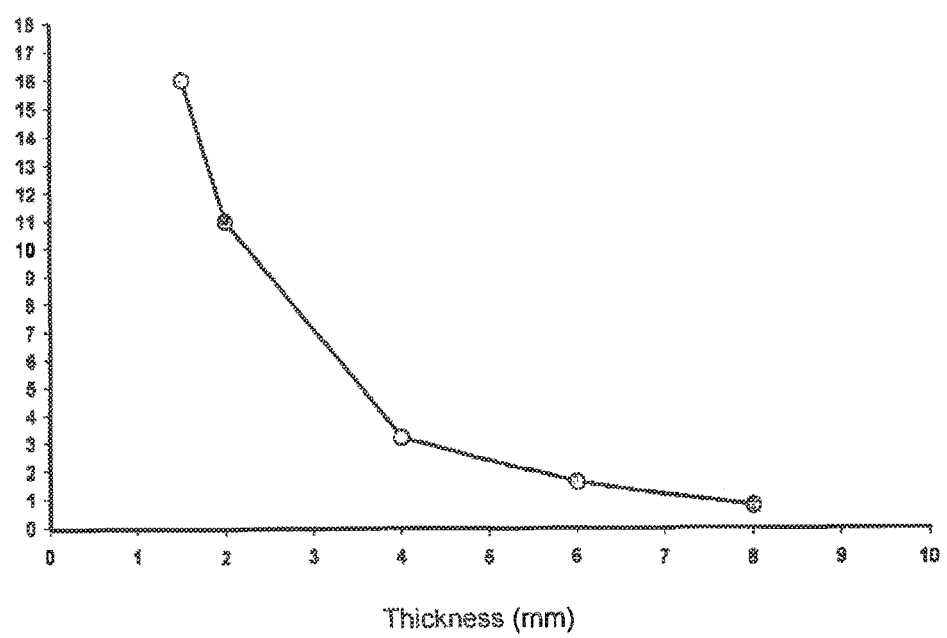
FIG. 2 illustrates the cutting speed obtained (plotted on the y-axis) as a function of the thickness to be cut (plotted on the x-axis)

The results obtained with a nitrogen pressure of 15 bar, which were judged to be satisfactory from the standpoint of the cutting quality obtained, are given in the appended FIG. 2, which shows the speed obtained (plotted on the y-axis) as a function of the thickness to be cut (plotted on the x-axis).

This figure shows that, on a 2-mm thick sheet, under the abovementioned experimental conditions, the method of the invention makes it possible to achieve a speed of the order of 16 m/min. However, this figure also shows that the cutting speed logically decreased with an increase in thickness of the material cut.

It should be emphasized that, after examination of the cut faces, the quality, in terms of burrs and striations, of the cuts obtained was very satisfactory, for all the thicknesses cut.

However, the maximum thickness cut under the abovementioned experimental conditions with the laser power used here was 8 mm.

The method of the invention is therefore effective both in terms of cutting speed and cut quality on stainless steel.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A laser cutting method for cutting a stainless steel workpiece, in which laser beam generation means comprising at least one ytterbium-containing fiber for generating a laser beam are used to melt the workpiece and thereby perform the actual cutting, wherein the quality factor of the laser beam is between 0.33 and 8 mm·mrad and cut by a coated, fused-silica lens having a focal length of between 80 mm and 510 mm, wherein a maximum angle for transmitting laser energy into the material is the sum of the angle of the cutting front ($\alpha$) and the divergence angle ($\theta$), and wherein the laser beam is at the maximum angle for transmitting laser energy during the actual cutting.

2. The method of claim 1, wherein the fiber is formed from an ytterbium-doped core clad with silica.

3. The method of claim 1, wherein the laser beam generated by the ytterbium-based fiber has a wavelength between 1 and 5 µm.

4. The method of claim 1, wherein the laser beam generated by the ytterbium-based fiber has a wavelength between 1.07 and 1.09 µm.

5. The method of claim 1, wherein the laser beam has a power of between 0.1 and 25 kW.

6. The method of claim 1, wherein the laser beam is a continuous or pulsed laser beam.

7. The method of claim 1, wherein the workpiece to be cut has a thickness between 0.25 and 30 mm.

8. The method of claim 1, wherein the cutting speed is between 0.1 and 25 m/min.

9. The method of claim 1, wherein the assistance gas for the laser beam is chosen from nitrogen, helium, argon and mixtures thereof, and it further contains one or more additional compounds chosen from $O_2$, $CO_2$, $H_2$ and $CH_4$.

10. The method of claim 1, wherein the quality factor of the laser beam is between 1 and 8 mm·mrad.

* * * * *